United States Patent Office 2,846,354
Patented Aug. 5, 1958

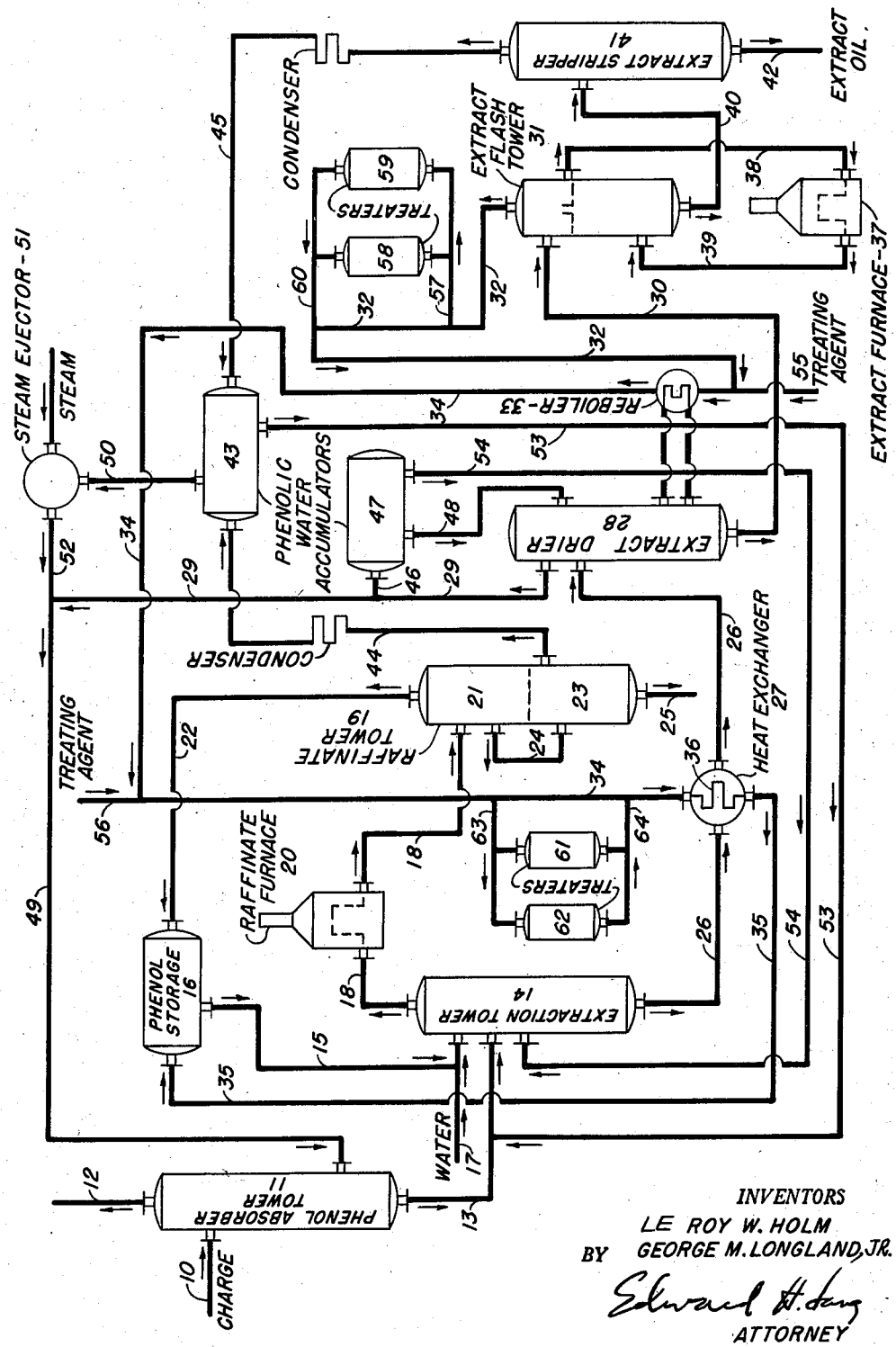

2,846,354

METHOD OF REDUCING CORROSION AND PLUGGING OF SOLVENT EXTRACTION PROCESS EQUIPMENT

Le Roy W. Holm, Crystal Lake, and George M. Longland, Jr., Algonquin, Ill., assignors to The Pure Oil Company, Chicago, Ill., a corporation of Ohio Application September 7, 1955, Serial No. 532,922

14 Claims. (Cl. 196—14.42)

This invention relates to a method for increasing the efficiency of solvent extraction processes utilized in the refining of oils and, more particularly, to a method for mitigating corrosion during the phenol extraction of mineral lubricating oils.

Solvent extraction has for some time been used to supplement the conventional treatments of lubricating oils, such as distillation and/or clay treating. In United States Patent 2,673,174 by E. P. King, a process of solvent extraction is described based on the finding that the presence of certain small amounts of ammonia effectively enhance the phase separation and increase the yield of high viscosity index raffinate oil obtained. In accordance with United States Patent 2,701,783 by Long and Basch, it is disclosed that the presence of between about 0.2 to 0.4 volume percent of ammonia based on the amount of feed oil in the extraction zone has the effect of aiding in the recovery of raffinates having a relatively low neutralization number.

Hendrey in United States Patent 2,128,029 has utilized substantial amounts of anhydrous ammonia as a means for recovering the selective solvents of the phenol type. The recovery is accomplished by reacting the phenolic type solvent with the ammonia to form a compound which will readily break down under the proper conditions to liberate the recovered phenolic-type solvent and ammonia for re-use in the process. The ability of ammonia to function as a solvent-modifying agent when in combination with a phenolic-type compound is shown by Arveson in United States Patent 2,092,199.

It is also known to use any water-soluble carbonates, such as sodium and potassium carbonate, injected into the cold solvent extract phase for the purpose of transforming the phenolic solvent to the phenolate and thus facilitating solvent recovery. Such a process is described by Lynch in United States Patent 2,246,376. The Lynch process does not employ an extract flash-tower and, accordingly, is unrelated to the present process.

It has been discovered that in the operation of the King process (supra), the hot phenol passing from the extract flash-tower carries with it certain corrosive, acidic, oxy-compounds (to be described), which cause severe corrosion in the reboilers and heat exchangers associated with the transfer line carrying the recovered phenolic solvent to storage. It has also been discovered that these acidic materials react with the metals in the transfer line and attendant equipment to form insoluble materials which, upon heating in the exchangers, precipitate and cause operational difficulties, principally by plugging the lines and heat-transfer equipment. It has further been discovered that by continuously adding sufficient amounts of certain agents, or a mixture of agents, to completely neutralize or otherwise react with these corrosive materials in the condensing phenolic solvent stream, the severe corrosion and plugging are overcome. Further, it has been found particularly advantageous to inject the neutralizing agent at the point or points of condensation of phenolic solvent vapors because many of the corrosive materials are formed during the high-temperature separation of phenols from the phenolic solvent extract stream, and the corrosive environment is at a maximum at these points in the system.

Accordingly, it is an object of this invention to provide a method of solvent refining which obviates or mitigates the corrosion in the phenolic solvent recovery system of a solvent refining process.

It is a further object of this invention to obviate and mitigate corrosion without causing or contributing to the formation of equipment-plugging, solid precipitates.

The accompanying drawing is a flow diagram of a conventional phenol extraction process with which the present invention may be used. Referring to the drawing, the preheated petroleum oil charge stock, which may consist of a low, intermediate, or high viscosity lubricating oil stock obtained as a side-stream from the vacuum distillation of a topped crude, or from the deasphalted residuum produced in the vacuum distillation process, is introduced by means of line 10 into phenol absorber-tower 11 wherein it is countercurrently contacted with a constant-boiling mixture of phenol and water obtained from a hereinafter-mentioned source. This initial treatment effects the removal of the phenol from the constant-boiling mixture and eliminates the necessity for employing a distillation process for separating the constituents of this phenol-water mixture, the separation of which would be extremely difficult because of the closeness of the boiling points of the distillate and the mixture from which the distillate is being produced.

The process water is removed in the vaporous state from absorber tower 11 by line 12 which transfers the phenol-free water to the waste disposal system of the refinery. The charge stock, containing minor amounts of phenol removed from the phenolic water, is then passed by line 13 to extraction tower 14 where it is countercurrently contacted with phenol to extract the undesirable constituents from the lubricating oil base stock. The phenol employed in this operation is introduced into the top of extraction tower 14 by means of line 15 which connects the extraction tower with phenol storage facility 16. Additional water to aid phase separation is added through line 17. Because of their immiscibility, the two liquids contacted in extraction tower 14 separate into two phases, namely, an oil-rich or raffinate phase which is withdrawn from the top of extraction tower 14 by means of line 18, and a solvent-rich or extract phase which is withdrawn from the bottom of the treating tower by means of line 26.

The overhead raffinate product is transferred from extraction tower 14 by means of line 18 to the evaporator or flash section 21 of raffinate tower 19. While being transferred, it passes through raffinate furnace 20 wherein it is heated to an elevated temperature sufficient to effect the flash distillation of the phenol constituent of the raffinate phase in flash section 21. The substantially anhydrous phenol produced is transferred via line 22 back to storage tank 16. The raffinate solution containing minor amounts of phenol passes into the stripping section 23 of raffinate tower 19 by means of line 24. In this section, the raffinate is denuded of trace amounts of remaining phenol by means of steam stripping. The finished raffinate, having distinctly improved characteristics of viscosity index, carbon residue, and general stability, passes from line 25 to subsequent processing steps such as solvent dewaxing, clay contacting or various blending operations to produce the finished lubricating oil.

The extract is withdrawn from the bottom of extraction tower 14 via line 26, passes through heat exchanger 27 and is introduced at an elevated temperature to extract drier 28 wherein the water contained therein is separated. There is also effected a partial phenol separation in this step, and as a result, the water and phenol are removed by line 29 as a vaporous, constant-boiling mixture of phenol and water. The elevated temperature required for this dehydration may be obtained by passing the extract solution in indirect heat exchange with other process streams or other suitable means. The anhydrous extract, still containing as much as 80% of phenol, is then withdrawn from the bottom of drier 28 and transferred via line 30 to extract flash-tower 31 wherein most of the phenol is separated by flash distillation. This phenol is normally removed as overhead effluent at line 32, passed directly through reboiler 33 and returned to the phenol storage 16 via lines 34 and 35 by way of coil 36 in heat exchanger 27. Reboiler 33 supplies the heat necessary to operate drier 28. Similarly, extract furnace 37 supplies the heat to extract flash-tower 31 to insure the substantial removal of most of the phenol from the anhydrous extract circulated therethrough by means of lines 38 and 39.

The bottoms from the flash tower 31 are then fed by line 40 into extract stripper 41. In this vessel, the remaining traces of phenol contained in the anhydrous extract are eliminated by means of steam stripping. The extract oil is removed from the bottom of stripper 41 by means of line 42. Although this extract oil contains the undesirable constituents separated from the lubricating oil base stock, it is nevertheless a marketable product which may be blended with fuel oils or used as a compounding agent in other types of compositions.

Phenol solvent initially introduced into tower 14 by means of line 15 is carried to the recovery section of the process by the raffinate and extract streams. The separation and recovery of phenol from these respective streams is effected in raffinate tower 19, extract drier 28, and extract flash-tower 31 and returned through lines 22, 34, and 35 to storage. The remaining amounts of phenol are recovered from the system in the form of mixtures of phenol and water originating from a number of locations, that is, extract drier 28, the stripping section of raffinate tower 19, and extract stripper 41. Phenolic vapors, comprising about 90% phenol and 10% water recovered from the stripping section of raffinate tower 19, and extract stripper 41, are condensed and transferred to phenolic water accumulator 43 by means of lines 44 and 45 respectively. Phenolic water vapor from drier 28, comprising about 90% water and 10% phenol, passes via line 29 and branch line 46 into phenolic water accumulator 47 where it is condensed and collected. Reflux in the form of phenolic water is withdrawn from phenolic water accumulator 47 and returned to extract drier 28 by means of line 48. Phenolic water vapors not required for refluxing are transferred by lines 29 and 49, or by means of line 50, through steam ejector 51 and lines 52 and 49, to the phenol absorber-tower 11 wherein the phenol constituent in the phenolic water mixture is separated by contact with the preheated charge stock introduced into the tower as hereinbefore mentioned. Portions of the phenolic water from accumulator 43 are introduced into feed line 13 by means of line 53 or from accumulator 47, into tower 14 through line 54. The phenolic water is introduced to increase the internal refluxing and to raise the immiscibility temperature of the phenol, with the oil charge stock within tower 14. Since the phenolic water changes the solvent characteristics of the phenol, the amount of phenolic water introduced into the extraction tower must be properly balanced to provide maximum efficiency.

In accordance with the King patent (2,673,174), ammonia supply is maintained for addition to the phenol and the phenolic water stream to improve the operation of the process and bring about better tower extraction efficiency. For this purpose, ammonia is injected into lines 44 and 45 going to phenolic water accumulator 43; into line 22 going to phenol storage; and into line 26 going to the extract drier 28. We have found that even with the injection of ammonia into various parts of the system, there is severe corrosion in phenol return-line 32 passing to reboiler 33, and in line 34 and coil 36 within heat exchanger 27.

Therefore, in accordance with this invention, means are provided to treat this returning hot phenol stream with an oxide, hydroxide, or carbonate salt of calcium or barium. The oxide, hydroxide or carbonate salt of calcium is much preferred. The compounds of calcium mentioned are unique for the purposes of this invention in that their reaction products with components in the system have been found to be sufficiently soluble in said environment to preclude plugging the equipment. The compounds of barium are passable in this respect, but the compounds of magnesium, strontium, aluminum, iron, sodium, potassium, and lithium are not suitable because the solubility of their reaction products in the phenolic environment is too low and plugging results. In view of this, it was entirely unexpected to find that the compounds of calcium, and to a lesser degree those of barium, were highly satisfactory and produced no plugging under normal circumstances.

Contact of the hot phenol stream returning to storage with the calcium or barium compounds of this invention may be accomplished in a number of ways. The phenol may be caused to pass through a stationary bed of the calcium or barium compounds. An injector system may be used whereby small amounts of the solid, comminuted compounds are picked up by the phenol as it leaves flash tower 31 or at spaced points along the lines 32 and 34, preferably at points just before reboiler 33, as at line 55 leading into line 32, and just before heat exchanger 27, as at line 56 leading into line 34.

A preferred system of contact of the calcium or barium compounds with the hot phenol stream is shown in the drawing. Returning hot phenol is diverted from line 32 into line 57 leading either to treater 58 or 59, or both, which are filled with granular solid particles of the calcium or barium compounds. Lumps, or beads of one or more of these treating materials may be used. It is only necessary that a portion of the returning hot phenol contact the treating materials, since the effect thereof builds up within the system to control the corrosion. Two treaters, 58 and 59, are shown in order that the treating material within one may be replaced while the other is on stream. Treated phenol leaves treaters 58 and 59 by line 60 which connects again with line 32 passing to reboiler 33.

Depending somewhat upon the conditions existing within phenol return lines 32 and 34, the pretreatment of the phenol in treaters 58 and 59 or by injection of finely divided compounds at line 55 will accomplish the reduction of corrosion in the entire system. However, in order to insure that heat exchanger 27 is protected, additional treaters 61 and 62 are placed in line 34 of the system and portions or all of the hot phenol passing through line 34 may pass through either or both of these latter treaters by means of lines 63 and 64.

The method of corrosion inhibition of this invention may be used along with the ammonia injection system of the King Patent 2,673,174, or may be used without such ammonia injection. It has been found that ammonia injection alone does not overcome corrosion in all parts of the system as experienced in the returning hot phenol line because the ammonia salts are dissociated in the extract furnace 37 thereby freeing the acidic materials which cause the corrosion.

In order to demonstrate the invention, the following example is given:

The extract flash-tower overhead passing through line 32, which comprises about 1350 tons per day of phenol, was analyzed and found to contain about 40 lbs. per day of chloride, 700 lbs. per day of volatile organic acids representing about 0.04 weight percent of volatile organic acids, and 50 lbs. per day of sulfur present as hydrogen sulfide. By periodic analysis of equipment deposits present primarily in reboiler 33 and the coil 36 of heat exchanger 27, it was found that in the normal corrosion process these chlorides, organic acids and sulfurs are converted into iron salts. These analyses also disclosed that the sulfur compounds were apparently primarily responsible for equipment plugging. To overcome this corrosion and plugging, a series of tests was conducted to determine which metals, more reactive than iron, formed sulfur compounds which were more soluble in phenol than the corresponding compounds of iron. It was found that the calcium and barium salts of these acidic materials were the only reactive products which were satisfactory. In the case of sulfate salts, for example, it was found that calcium sulfate, barium sulfate, magnesium sulfate and iron sulfate were the most soluble in phenol. Calcium sulfate was found to be soluble to the extent of 0.014 weight percent, and barium sulfate to the extent of 0.008 weight percent, while magnesium sulfate and iron sulfate were soluble only to about 0.004 weight percent in the phenol. Sulfate salts of other metals, such as sodium, potassium and aluminum, were found to be even less soluble than iron or magnesium. It was found that by treating the extract flash-tower overhead stream in line 32 with calcium oxide, the acid number of this phenol stream containing about 0.04 weight percent of volatile acids and 6 p. p. m. of chloride was reduced to zero. Similar results are obtainable using calcium hydroxide, calcium carbonate, or mixtures thereof.

By treatment in accordance with the example, it will be found that the corrosion and plugging within those portions of the equipment in which there is condensing phenol will be greatly reduced. Also, there will be no plugging or corrosion in the conduits carrying the hot phenol overhead stream. Corrosion and plugging within such equipment as the reboiler 33 and the coil 36 of heat exchanger 27 will be negligible or substantially reduced. When using stationary beds of the calcium treating agent, such as may be contained in treaters 58 and 59 or 61 and 62, the hot phenol stream passing through line 60 into line 32 or through line 64 into line 34 will be non-corrosive and free of plugging tendencies because the calcium salts formed in the treaters are soluble in the phenol. As an alternative, the hot phenol stream may be caused to pick up a small amount of the calcium compounds found to be effective through injection at points in the returning overhead phenol line just prior to apparatus in which condensation of the phenol will take place. This is illustrated by injection of the calcium compounds through branch lines 55 and 56. To accomplish this injection a venturi system may be used to incorporate the solid comminuted calcium compounds in the phenol stream or through the injection of a slurry of additional phenol carrying the calcium compounds and acting as a solvent therefor.

The amounts of calcium and barium compounds used to accomplish the results of this invention are not excessive. In most instances it will be found that reduction in corrosion and plugging can be obtained by maintaining an average of about 0.01 to 0.05 weight percent of the compounds based on the amount of phenol in the system. This concentration can be maintained by injecting about 20 to 25 lbs. per day of the calcium compounds. Where a stationary bed of the agent is used, it will be necessary to maintain from about 50 to 100 lbs. of treating compound in each treater. Since the phenol stream entering treaters 58, 59, 61 and 62 is in vapor form, the main reaction of the treating agents with the deleterious corrosive acids, chlorides and sulfur compounds takes place within the treaters. These reaction products are non-volatile and are thus removed from the system. Only so far as some liquid phenol may be in equilibrium with the vapor stream or formed in the treaters will there be any carry-over of treating agent into the phenol stream leaving the treaters. Since the treating agents and their reaction products are soluble in liquid phenol, small quantities of both may be carried along with the phenol stream. This has two distinct advantages. It is a self-cleaning operation for the treaters and increases the active contact area of treating agent. The reaction products of treating agent and deleterious materials carried over eventually end up in the extract oil phase which is discharged. Secondly, any treating agent carried over is present to inhibit corrosion at phenol-condensing points removed from the treaters, as in the reboiler 33 and coil 36. Reaction products of this secondary inhibition reaction also end up in the extract oil phase. Because the treating agents are inexpensive and regeneration is uneconomical, any excess left in one treater after it has been on stream is discarded and replenished with a new supply.

It is possible to treat the phenol in storage or fresh phenol entering the system with the treating agents of this invention. The treating agents could be introduced, for example, into line 15 or line 17 to act within the extraction tower 14. The reaction products formed would pass into the extract phase and eventually find their way to the extract oil phase coming from line 42. Any unreacted treating agent from this mode of operation would remain in the liquid phenol-extract phase passing through line 30 to extract flash-tower 31 and also find its way to the extract oil phase. The phenol vapors from extract flash-tower 31 would be free of deleterious corrosive materials and accomplish the desired results. However, it would be necessary to carefully control the amount of treating agent added in this manner so as to prevent overloading the extraction tower 14 and prevent carry-over of reaction products into the raffinate phase.

Experience with the solvent extraction system has shown that the rate of corrosion in the returning phenol line is a function of the pressure and temperature. At any temperature above about 200° F. corrosion in the severest form has been found at those places in the system, as in reboiler 33 and coil 36 of heat exchanger 27, where the phenol is at the condensing point. Under atmospheric pressure this temperature of greatest corrosion will be about 356° F. Severe corrosion is experienced in the range of about 350° to 400° F. under which conditions the phenol may be partially condensing or entirely in the vapor form. Accordingly, the invention is applicable broadly to reduction of corrosion by phenol at temperatures above 200° F. or between about 350° to 400° F. The invention finds particular application to the reduction of corrosion under those conditions where it is most severe, that is at the condensing point of phenol.

Although the invention has been described by certain examples, the only limitations attaching thereto appear in the appended claims.

What is claimed is:

1. In a solvent refining process for improving the qualities of mineral lubricating oil wherein an oil is contacted with a phenol solvent to produce an oil-rich phase and a solvent-rich phase which are subjected to heating conditions whereby the phenol solvent is removed for recycle into the system, the improvement comprising maintaining a contact material selected from the group consisting of calcium oxide, calcium hydroxide, calcium carbonate, barium oxide and barium hydroxide and mixtures thereof in contact with the phenol prior to subjection to said heating conditions, said material being present in amounts up to the equivalence of about 0.05 percent by weight based on the amount of phenol and sufficient to prevent corrosion and plugging in the process equipment.

2. The method in accordance with claim 1 in which the material is calcium oxide.

3. The method in accordance with claim 1 in which the material is calcium hydroxide.

4. The method in accordance with claim 1 in which the material is calcium carbonate.

5. The method in accordance with claim 1 in which the material is barium oxide.

6. The method in accordance with claim 1 in which the material is barium hydroxide.

7. The method in accordance with claim 1 in which the phenol solvent contains a sufficient amount of volatile organic acids, chloride and sulfur to cause corrosion in said process equipment.

8. The method in accordance with claim 1 in which the acid number of the phenol solvent is reduced to zero by said contact material.

9. The process for mitigating the corrosion of metal surfaces of process equipment in contact with phenol at elevated temperatures which comprises contacting said phenol prior to entry into said process equipment with a material selected from the group consisting of calcium oxide, calcium hydroxide, calcium carbonate, barium oxide and barium hydroxide in an amount equivalent to about 0.05 percent by weight based on the amount of phenol.

10. The method in accordance with claim 9 in which the phenol is at a temperature above about 200° F.

11. The method in accordance with claim 10 in which the phenol is at a temperature of about 350°–400° F.

12. The method in accordance with claim 11 in which the phenol is partially condensing on the metal surface.

13. The method in accordance with claim 12 in which the phenol contains a sufficient amount of volatile organic acids, chloride and sulfur to accelerate the corrosion of said metal surfaces.

14. In a solvent refining process for improving the qualities of mineral lubricating oil wherein an oil is contacted in the liquid phase with phenol to produce a raffinate phase and an extract phase, which extract phase is subjected to vaporization whereby the phenol is removed in vapor form and recycled through heat exchange equipment to supply heat for said vaporization, the improvement comprising passing said phenol vapors into contact with a treating agent selected from the group consisting of calcium oxide, calcium hydroxide, calcium carbonate, barium oxide and barium hydroxide and mixtures thereof under conditions such that the treating agent reacts with deleterious corrosive materials carried by the phenol vapors and the corrosiveness of said phenol vapors is thereby mitigated.

References Cited in the file of this patent

UNITED STATES PATENTS

| | | |
|---|---|---|
| 1,646,698 | Koppers | Oct. 25, 1927 |
| 1,873,136 | Laird | Aug. 23, 1932 |
| 2,246,376 | Lynch | June 17, 1941 |
| 2,276,089 | Ragatz | Mar. 10, 1942 |
| 2,420,108 | Stratford et al. | May 6, 1947 |
| 2,660,600 | Bowman | Nov. 24, 1953 |
| 2,673,174 | King | Mar. 23, 1954 |
| 2,701,783 | Long et al. | Feb. 8, 1955 |

OTHER REFERENCES

Dunn et al.: Oil & Gas Journal, June 9, 1952, p. 69.